UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,034,002.  Specification of Letters Patent.  Patented July 30, 1912.

No Drawing.  Application filed January 27, 1911.  Serial No. 604,927.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Storage Batteries, of which the following is a specification.

In Letters Patent of the United States, No. 873,220, dated December 10, 1907, and No. 946,540, dated January 18, 1910, I described certain improvements in storage batteries, in which alkaline electrolytes are used and in which the active depolarizing material consists of an oxygen compound of nickel to which an oxygen compound of bismuth is added, which results in a substantial increase in the capacity of the cell.

My present invention relates to an improved process for preparing the depolarizing material, whereby a more intimate mixture of the oxygen compounds of nickel and bismuth is obtained, and the segregation of either of the compounds is prevented.

In carrying my invention into effect, and assuming that the process is to be utilized commercially in connection with the manufacture of the depolarizing material before the latter is introduced into the receiving pockets, or otherwise utilized in connection with the make-up of electrodes of storage batteries, I proceed substantially as follows: Nickel hydroxid is precipitated from a suitable solution and while the precipitate or pulp is being stirred, a pulp of recently precipitated bismuth hydroxid, which has not been dried, is added. The stirring of the resulting pulp is continued until the two precipitates, namely, the nickel hydroxid and the bismuth hydroxid, are thoroughly mixed together. The pulp is then dried, and after it is dried, it is thoroughly washed and then re-dried. The resulting dry mixture is then ready for use, and may be introduced into the receiving pockets, or used in connection with the make-up of the electrodes of storage batteries in any suitable way.

Bismuth hydroxid when dried becomes anhydrous, and if it were permitted to dry before mixing it with the nickel hydroxid, the former would segregate in the latter. In my improved process, the bismuth hydroxid is not dried until after it has been thoroughly and intimately mixed with the nickel hydroxid, and it is then prevented from segregating even though anhydrous.

Having now described my invention, what I claim and desire to protect by Letters Patent is as follows:

1. The process of preparing an active depolarizing material for alkaline storage batteries, which consists in mixing hydroxid of nickel with freshly precipitated hydroxid of bismuth, and then drying the mixture, substantially as described.

2. The process of preparing an active depolarizing material for alkaline storage batteries, which consists in precipitating nickel hydroxid from one solution and bismuth hydroxid from another solution, then thoroughly mixing the two precipitates before either is dried, and drying the mixture, substantially as described.

3. The process of preparing an active depolarizing material for alkaline storage batteries, which consists in mixing freshly precipitated hydroxids of nickel and bismuth, then drying, washing, and finally redrying the mixture, substantially as described.

4. The process of preparing an active depolarizing material for alkaline storage batteries, which consists in precipitating nickel hydroxid from one solution and bismuth hydroxid from another solution, then thoroughly mixing the two precipitates before either is dried, then washing, drying, and finally redrying the mixture, substantially as described.

5. The process of preparing an active depolarizing material for alkaline storage batteries, which consists in mixing an oxygen compound of nickel with freshly precipitated hydroxid of bismuth, and drying the mixture, substantially as described.

This specification signed and witnessed this 25th day of January 1911.

THOMAS A. EDISON.

Witnesses:
DYER SMITH,
ANNA R. KLEHM.